United States Patent [19]

Fridman et al.

[11] Patent Number: 5,339,125
[45] Date of Patent: Aug. 16, 1994

[54] CAMERA WITH DATA IMPRINTING DEVICE

[75] Inventors: Vladimir Fridman, New City, N.Y.; Arthur Zawodny, Sommerville, N.J.

[73] Assignee: Concord Camera Corporation, Avenel, N.J.

[21] Appl. No.: 12,238

[22] Filed: Feb. 2, 1993

[51] Int. Cl.5 ............... G03B 17/24; G03B 15/02
[52] U.S. Cl. .................... 354/106; 354/126
[58] Field of Search ........... 354/106, 107, 108, 126

[56] References Cited

U.S. PATENT DOCUMENTS

| | | | |
|---|---|---|---|
| 1,362,787 | 12/1920 | Gongaware | 354/108 |
| 1,363,414 | 12/1920 | Hafmann et al. | 354/108 |
| 1,368,614 | 2/1921 | Dey | 354/108 |
| 1,473,902 | 11/1923 | Charbeneau | 354/108 |
| 4,028,713 | 6/1977 | Ohashi et al. | 354/106 |
| 4,190,338 | 2/1980 | Okuno et al. | 354/106 |
| 4,265,526 | 5/1981 | Dearing et al. | 354/106 |
| 4,973,997 | 11/1990 | Harvey | 354/106 |
| 5,126,773 | 6/1992 | Ono et al. | 354/106 |
| 5,189,453 | 2/1993 | Boyd | 354/107 X |

Primary Examiner—Michael L. Gellner
Assistant Examiner—Jae N. Noh
Attorney, Agent, or Firm—Robert D. Schaffer

[57] ABSTRACT

A camera is disclosed which provides for symbol imprinting on film using a second aperture through which light passes thereby exposing the symbols on the film.

13 Claims, 7 Drawing Sheets

CAMERA WITH DATA IMPRINTING DEVICE

BACKGROUND OF THE INVENTION

1. Field of the Invention

The present invention generally relates to a camera having a symbol imprinting means. The device herein disclosed allows a camera user to imprint symbolic information on the film when a picture is taken. Specifically, the present invention discloses a mechanism which imprints symbolic information on film by using either the natural light or the light from the flash attachment on a camera for exposure onto the film. By providing such a mechanism, cameras may be provided with a data imprinting facility in a compact size with heretofore unrealized simplicity and economy.

2. Description of the Prior Art

Cameras using natural light for exposing data on the photosensitive surface of film are known. For example, U.S. Pat. Nos. 813,808; 1,192,058; 1,224,588; 1,249,612; 2,226,364; and 3,478,657 all generally relate to this feature. However, all of these cameras utilize complicated mechanisms, having a multitude of parts with the concomitant difficulty of assemblage and cost. Further, cameras which follow the teachings of these disclosures have a variety of operational inconveniences. None of these devices disclose a manner by which a device can use natural light for exposing data on film or which can utilize the light from a camera flash when such is necessary.

There is therefore a great need in the art for a device which can imprint data onto film which uses either natural light or a camera flash and which is also simple, compact, and economical manufacture and sell.

SUMMARY OF THE INVENTION

Accordingly, there is now provided with this invention an improved symbol imprinting mechanism effectively overcoming the aforementioned difficulties and longstanding problems inherent in the manufacture of cameras with data imprinting mechanisms. These problems have been solved in a simple, convenient, and highly effective way by providing a mechanism in a camera which can use either natural light or the camera flash for exposing data onto the film. More particularly, a device is provided which has fewer parts and which is more economic to manufacture than any other device previously disclosed.

According to one aspect of the invention, a camera for imprinting symbols on film is disclosed. The camera has a first aperture for allowing light to pass therethrough and a first shutter associated with the first aperture. The first shutter controls when the light is to pass through the first aperture to the film. The camera has a second aperture for allowing light to pass therethrough and a second shutter associated with the second aperture for controlling when the light is to pass through the second aperture to the film. The camera also has symbol imprinting means having symbols thereon. The symbol imprinting means is in optical communication with the second aperture and the film and is positioned therebetween. When the second shutter is activated, light can pass therethrough for allowing a symbol to be exposed on the film.

As will be appreciated by those persons skilled in the art, a major advantage provided by the present invention is a simple method of imprinting data upon film. It is therefore an object of the invention to provide an economical means of exposing symbols on film.

It is a further object of the present invention to provide a means of imprinting data on film without the means of supplemental light.

Another object of the present invention is to provide a symbol imprinting mechanism in a camera which can be easily changed and accessed by a user.

It is another object of the present invention to provide a symbol imprinting means which does not interfere with the picture taking process.

It is still another object of the invention to provide a camera in which the light for exposing symbols on film is routed around the main film chamber.

It is a further object of the present invention to provide a means for printing data on the back of the film to thereby leave the entire film open for the picture subject and which is not despoiled by data imprinted thereon.

It is a still further object of the present invention to provide a symbol imprinting mechanism in a disposable camera which can be accurately positioned.

Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

Specific embodiments of the present invention will be described with reference to the following drawings, wherein.

DESCRIPTION OF THE PREFERRED EMBODIMENT

The following preferred embodiment as exemplified by the drawings is illustrative of the invention and is not intended to limit the invention as encompassed by the claims of this application.

Figure 1:
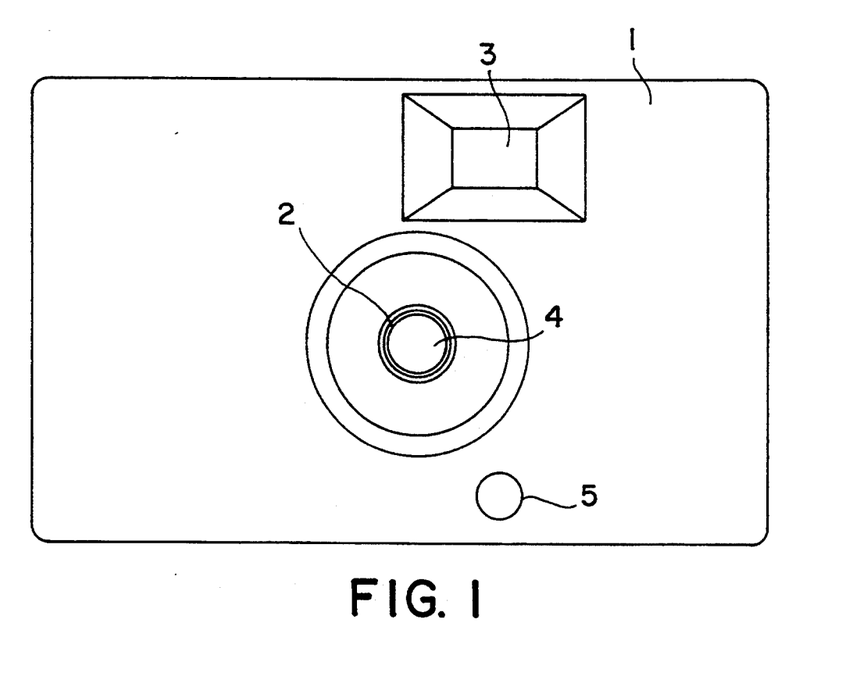
FIG. 1 is a front view of the camera of the present invention.

In FIG. 1, a front view of a camera 1 is illustrated having a lens 2, and a viewfinder 3. The lens 2 provides for the light passing through a first aperture 4 to be focused upon the film. Also shown in the front of the camera is a second aperture 5. The second aperture 5 is provided for allowing light to pass therethrough towards a data imprinting device (which will be discussed in detail below).

Figure 2:
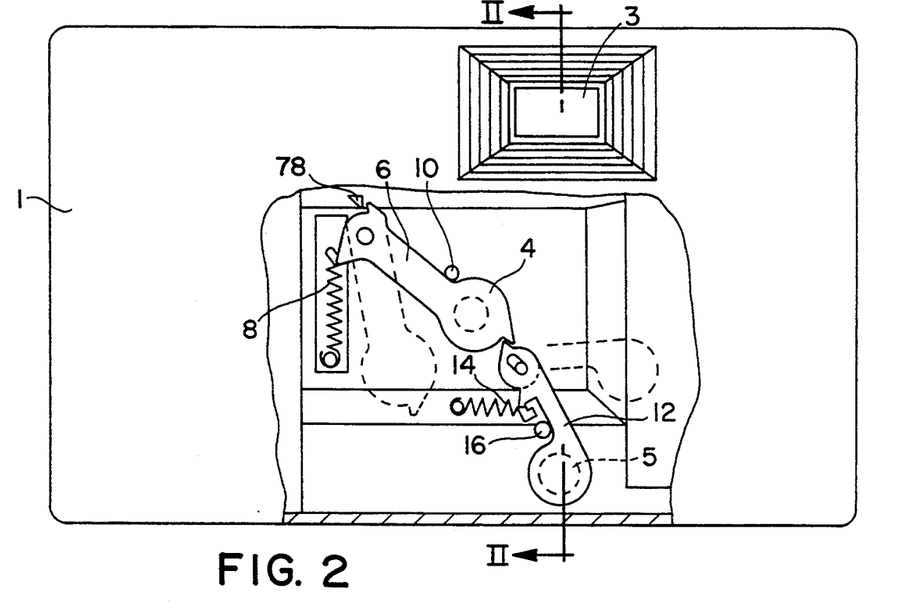
FIG. 2 is a front, partially cut away view of the camera illustrated in FIG. 1.

FIG. 2 illustrates the camera shown in FIG. 1 with a portion of the front cover removed thereby revealing a first shutter mechanism 6 which is disposed behind the first aperture 4. The first shutter 6 is biased for closing off the first aperture to light by a first spring 8 so that light cannot pass therethrough. A first stop 10 is provided in the camera for positioning the first shutter in its closed off position. The first shutter is shown in FIG. 2 in its closed off position.

A second shutter 12 is disposed behind the second aperture 5. The second shutter 12 is biased for closing off the second aperture to light by a second spring 14 so that light cannot pass therethrough. A second stop 16 is provided in the camera for positioning the second shutter 8 in its closed off position. The second shutter is shown in FIG. 2 in its closed off position.

Figure 3:
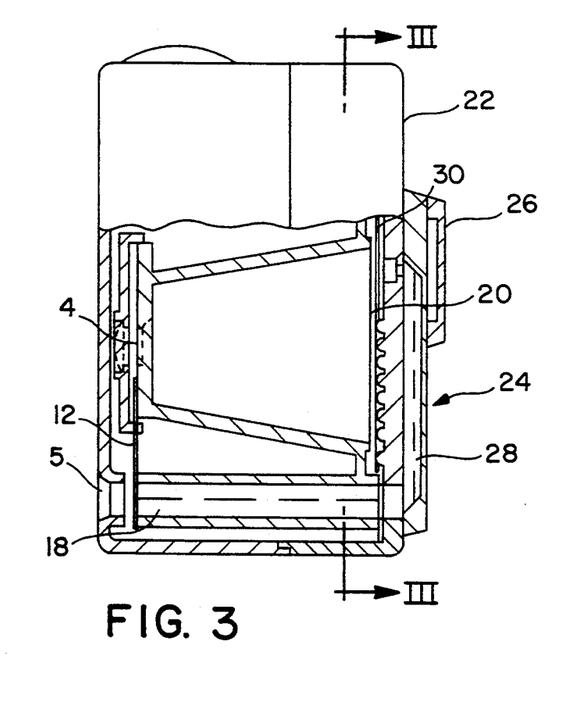
FIG. 3 is a side, partially cut away view taken along section line II—II of FIG. 2.

FIG. 3 illustrates a sectional view of the camera taken along the sectional line II—II of FIG. 2. A tunnel 18 is shown leading from the second aperture 5 behind the second shutter 12. The tunnel 18 leads from the second aperture around the main film chamber to a symbol imprinting mechanism 20. The symbol imprinting mechanism 20 is mounted on a back cover 22 of the camera.

The symbol imprinting mechanism 20 (see FIG. 3) comprises a housing 24 having an attached cover 26. A light transmitting means 28, for example, a prism is positioned inside the housing 24. The light transmitting means 28 (or prism) directs the light from the tunnel 18 toward and through the symbol imprinting mechanism 20 and onto the film 30. The prism 28 may be manufactured from a variety of optically suitable materials, for example, glass or plastic.

Figure 4:
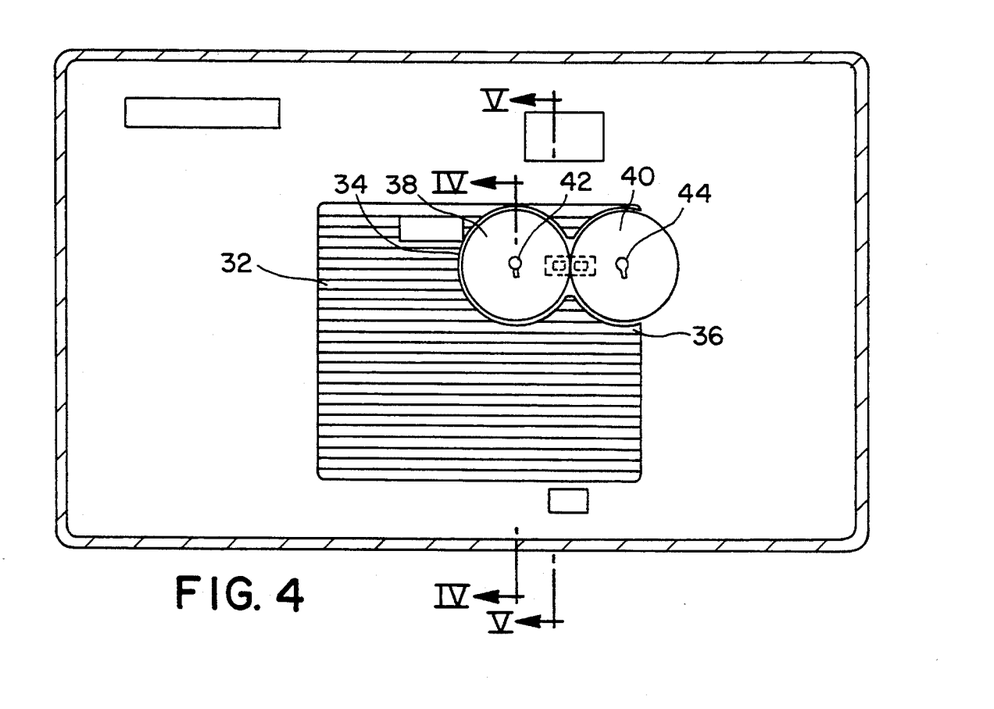
FIG. 4 is a sectional view taken along section lines III—III of FIG. 3.

FIG. 4 illustrates a sectional view of the camera taken along section line III—III of FIG. 3. A pressure plate 32 is shown therein which is positioned so that it is in contact with the photographic film (not shown). The pressure plate 32 has two recessed areas 34 and 36 for positioning disks of the symbol imprinting means. A first printing disk 38 of the symbol imprinting means is positioned in the recessed area 34 and a second printing disk 40 of the symbol imprinting means is positioned in the recessed area 36. The printing disks 38 and 40 have different symbols imprinted thereon. These symbols can be for example, data, legends, letters for denoting a message, numbers for identifying dates, months, or years, etc. Although the symbol imprinting means are illustrated as disks in the particular embodiment depicted herein, they can also be in the form of transparent strips, belts, or any other form so that they can be preferentially positioned for imprinting data on the film.

The symbol imprinting means (here, in the form of disks) are made of thin flexible film. The thin flexible film from which the disks are made is preferentially acetal film and preferentially ranges in thickness from about 0.05 mm to about 0.20 mm. The disks are flexible in order to follow the shape and contour of the photographic film as the photographic film passes on and along the pressure plate 32. Thus, as the photographic film bends along the concavity of the pressure plate, the flexible disks similarly follow the contour of the photographic film. This increases the sharpness of the symbols exposed from the disks onto the back surface of photographic film.

The symbols imprinted thereon are preferentially transparent on an opaque background. Of course, as is well known in the art, this can be reversed and they can be opaque on a transparent background. The disks also preferentially have a portion thereon which is impenetrable to light when such symbol imprinting is not desired by the user.

The disks can be in the form of a variety of geometrical shapes. If the disks are selected to be polygonal in shape, the number of sides could be selected to correspond with the number of symbols on the disks. It has been found that by having polygonal disks, instead of round disks, less material is needed for manufacture.

The disks 38 and 40 are fixedly attached to shafts 42 and 44 respectively. The shafts 42 and 44 are fixedly connected to setting dials 46 and 48 (shown in FIG. 7). Alternatively, the shafts and the respective dials could be a single integrated element. (This is illustrated in FIG. 6.)

Figure 5:
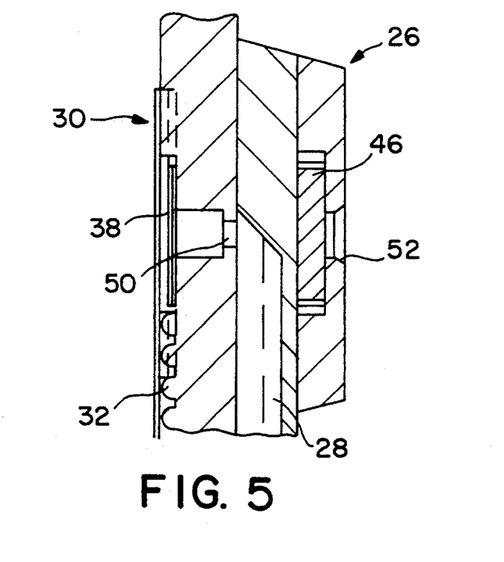
FIG. 5 is a side sectional view taken along section line IV—IV of FIG. 4.

FIG. 5 illustrates an enlarged sectional view of the camera taken along section line IV—IV of FIG. 4. An opening 50 is illustrated therein for allowing the light to be directed from the prism 28 through the opening 50 and through the disk 38 onto the film 30. In this way, symbols imprinted on the disk are exposed onto the back surface of the film.

A window 52 is provided on the attached cover 26 of the camera. The user may view markings on the setting dials through the window 52. The markings on the setting dials correspond to the symbols to be exposed upon the film. In this way, the setting dials may be oriented so that the symbols on the symbol imprinting means are properly selected for exposure on the film.

Figure 6:
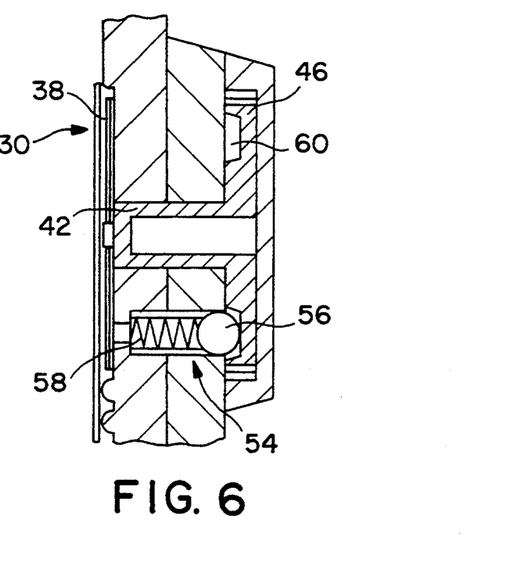
FIG. 6 is a sectional view taken along section line V—V of FIG. 5.

FIG. 6 is an enlarged sectional view of the camera taken along sectional line V—V of FIG. 4. Depicted therein is an indexing means for positively positioning the symbol imprinting mechanism in place. The preferred means for positively positioning the symbol imprinting means in a selected position is a click-stop mechanism 54. The click-stop mechanism 54 comprises a ball 56 which is biased by a spring 58 toward grooves 60 provided in the symbol imprinting means. This mechanism allows the symbol imprinting means to be indexed by rotation of the setting dials. The number of grooves provided on the setting dials corresponds to the number of symbols provided on the disks. As previously disclosed, the setting dials have identically correlated symbols to the symbols on the disks which are conveniently viewed through the window 52.

Figure 7:
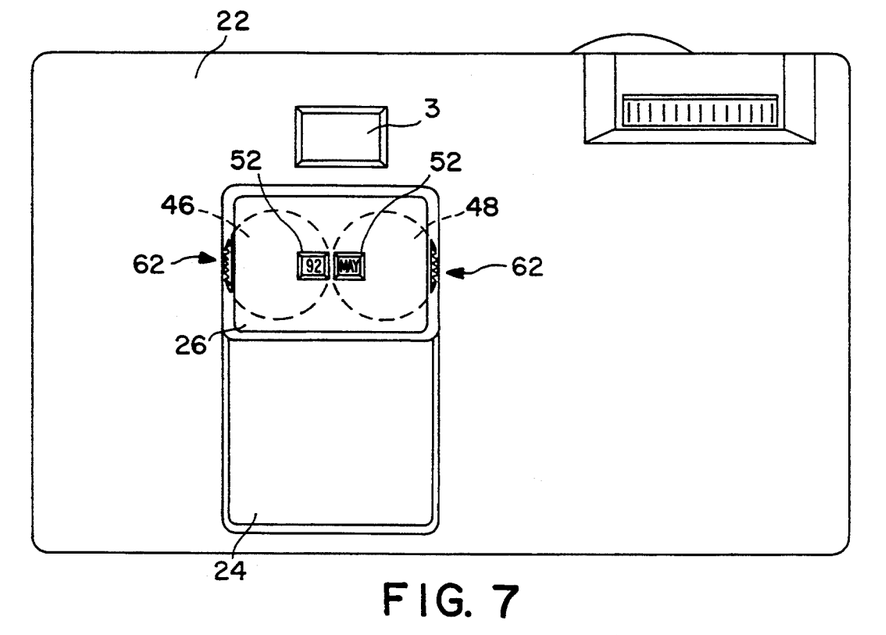
FIG. 7 is a rear view of the camera of the present invention.

FIG. 7 shows a rear view of the camera of the present invention. As illustrated therein, the setting dial 46 depicts a year and the setting dial 48 depicts a month. The setting dials 46 and 48 are accessible and are made easily selectable by having an outer serration 62 provided on their circumference. The outer serration 62 on the setting dials allow for the dials to be easily rotated by the user for thereby selecting the symbol for imprinting onto the film.

Figure 8:
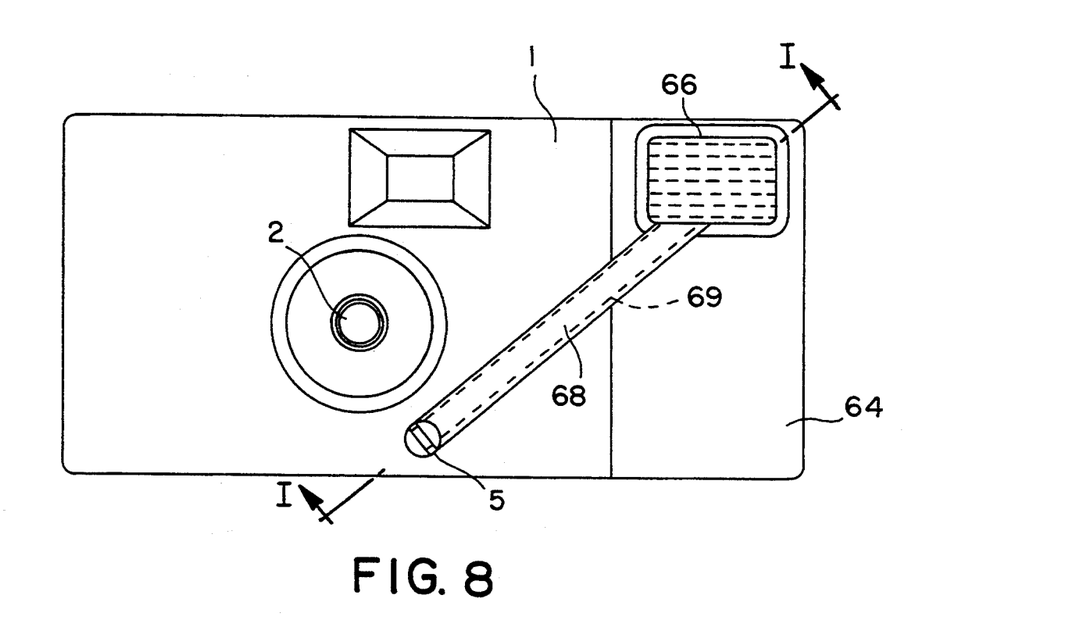
FIG. 8 is another embodiment of the camera of the present invention.
Figure 9:
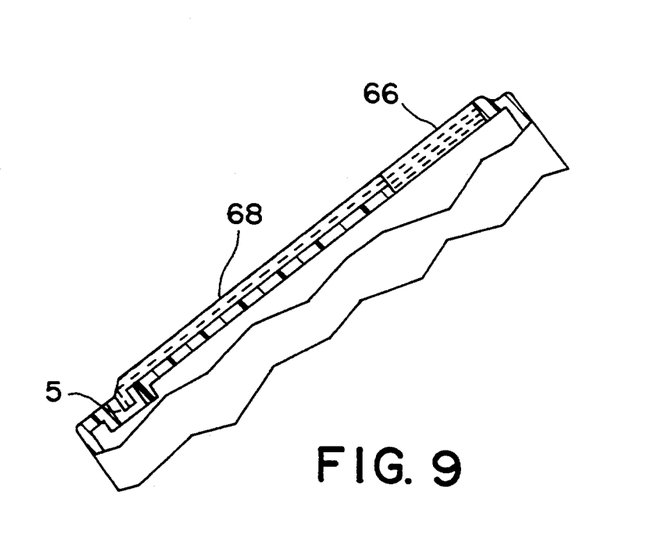
FIG. 9 is a sectional view taken along section line I—I of FIG. 8.

FIGS. 8 and 9 show another embodiment of the present invention. In the embodiment depicted therein, a camera is shown adapted for imprinting symbols on film when a flash mechanism 64 is employed. In FIGS. 8 and 9 the camera is shown having the flash mechanism 64. The flash mechanism 64 automatically flashes when the camera is actuated for taking a picture. A light conducting means 68, for example, a pipe is provided in the camera. The light pipe 68 connects the chamber having a flash strobe light 66 to the tunnel 18. In this way, a portion of the light emanating from the strobe light is directed through the light pipe 68 and toward the symbol imprinting mechanism. Positioned in the light pipe 68 can be a light transmitting means, for example, a prism 69 as previously described with reference to FIG. 3.

Figure 10:
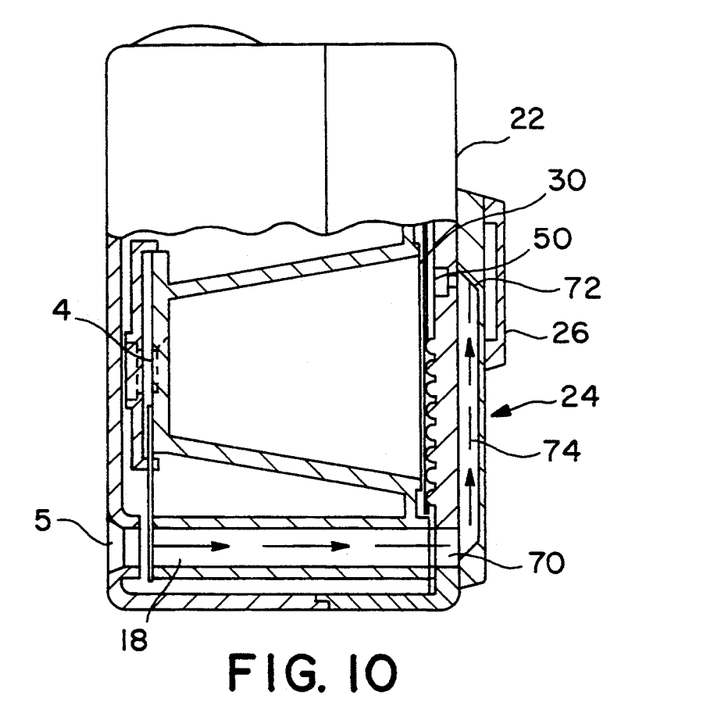
FIG. 10 illustrates a further embodiment of the present invention.

FIG. 10 illustrates a further embodiment of the invention. FIG. 10 is similar to FIG. 3. However, in place of the prism 28 shown in FIG. 3 for conducting the light from the tunnel 18 to the film 30, a first mirror 70 and a second mirror 72 are employed. A passage 74 is between the first and the second mirror. By placing the mirrors 70 and 72 at the proper angle, the light entering the second aperture 5 passes through the tunnel 18, is reflected by the first mirror 70 through the passage 74 to the second mirror 72, through the opening 50, through the symbol imprinting means, and onto the film 30.

Figure 11:
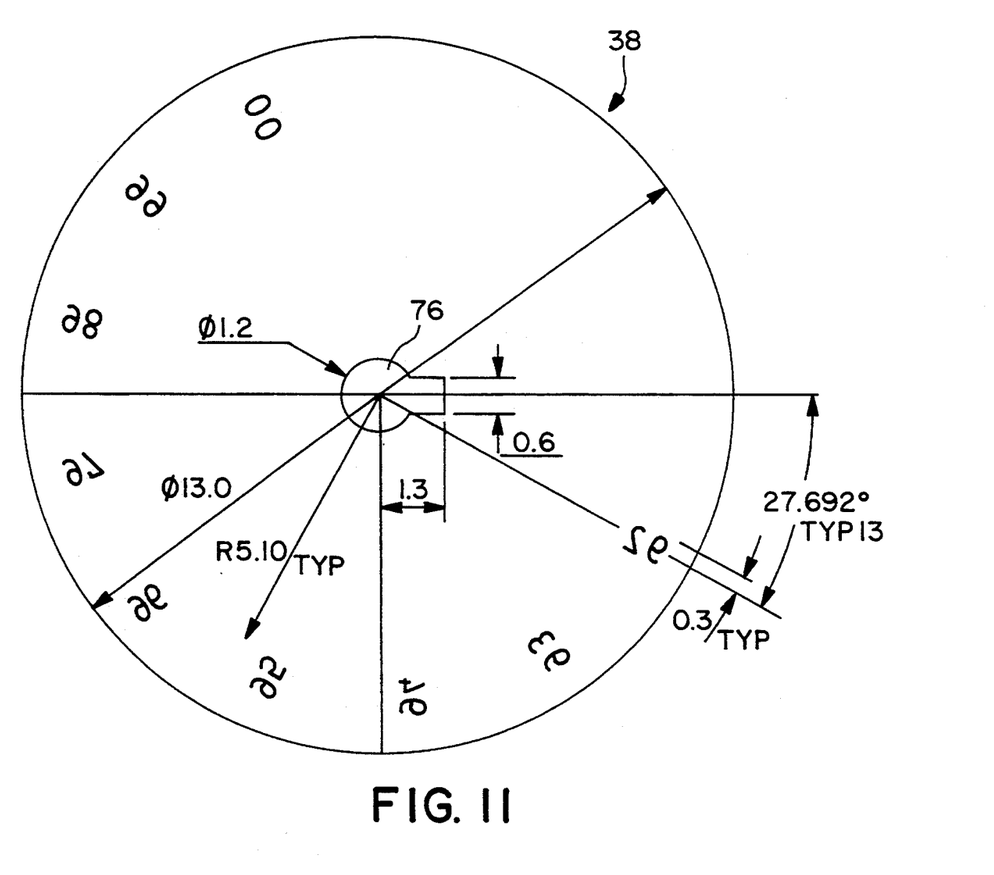
FIG. 11 illustrates one aspect of the symbol imprinting means of the present invention.

FIG. 11 illustrates an embodiment of one of the disks 38 of the symbol imprinting means. In the center of the disks 38 a keyway 76 is provided for positively locking the shaft 42 to the disk. In this way, the setting dial 46 attached to the other end of the shaft 42 can rotate the disk.

In operation, when a picture is taken, a striker 78 (shown in FIG. 2) actuates the first shutter 6. The first shutter 6 moves thereby opening the first aperture 4. It is preferable that when the first shutter 6 moves, it in turn actuates the second shutter 12. Optionally, the second shutter 12 may be independently actuated.

The actuation of the second shutter 12 opens the second aperture 5 thereby allowing light to enter the tunnel 18. The light travels through the tunnel and reaches the prism 28 (or mirror 70). The light is directed by the prism to the symbol imprinting means 20. When symbols on the disks are selected for imprinting, then they are printed on the reverse of the film.

If the portion of the symbol imprinting means is selected so that no symbols are desired to be printed, then that portion of the symbol imprinting means which is impenetrable to light would be selected. In this event, the subject picture would be taken and no data or symbol would be printed in conjunction therewith.

The first spring 8 brings the first shutter 6 to its "home" position and the second spring 14 brings the second shutter 12 to its "home" position.

When the camera is used with a flash mechanism, the sequence of action would be identical to that previously described. A portion of the light emanating from the flash would be transmitted through the light pipe 68 and directed to the tunnel 18 and to the prism 28 (or mirrors 70 and 72) and to the symbol imprinting means. This additional light compensates for the deficiency of ambient light and ensures quality printing.

Although the particular embodiments shown and described above will prove to be useful in many applications in the photographic art to which the present invention pertains, further modifications of the present invention herein disclosed will occur to persons skilled in the art. All such modifications are deemed to be within the scope and spirit of the present invention defined by the appended claims.

What is claimed is:

1. A camera for imprinting symbols on film, comprising:
   a. a first aperture in the camera for allowing light to pass therethrough to the other side of the film;
   b. a first shutter associated with said first aperture for controlling when the light is to pass through said first aperture to the film in the camera for allowing to light to pass therethrough;
   c. a flash bulb for activation when said first shutter is activated when ambient light is insufficient to properly expose the film;
   d. a second aperture for allowing light to pass therethrough from said flash bulb to the other side of the film;
   e. a second shutter associated with said second aperture for controlling when the light is to pass through said second aperture to the film;
   f. a symbol imprinting means having symbol thereon in optical communication with said second aperture and the film and positioned therebetween, thereby when said second shutter is activated, light can pass therethrough for allowing a symbol to be exposed on the other side of the film.

2. The camera of claim 1, wherein said first shutter is operably associated with said second shutter so that when said first shutter is activated, said second shutter is automatically activated.

3. The camera of claim 1, further comprising means for positively positioning said symbol imprinting means in a selected position.

4. The camera of claim 1, wherein said symbol imprinting means comprises at least one flexible disk.

5. The camera of claim 2, further comprising a light conducting means positioned between said second aperture and said symbol imprinting means for directing the light from said second aperture to and through said symbol imprinting means and onto the film.

6. The camera of claim 2, further comprising a first mirror, a second mirror, and a light tunnel positioned therebetween, wherein said first mirror is positioned proximate said second aperture and said second mirror is positioned proximate said symbol imprinting means for directing the light from said second aperture to and through said symbol imprinting means and onto the film.

7. A camera for imprinting symbols on film, comprising:
   a. a first aperture in the camera for allowing light to pass therethrough to one side of the film;
   b. a first shutter associated with said first aperture for controlling when the light is to pass through said first aperture to the film;
   c. a second aperture in the camera for allowing light to pass therethrough;
   d. a second shutter associated with said second aperture for controlling when the light is to pass through said second aperture to the film;
   e. symbol imprinting means having symbols thereon in optical communication with said second aperture and the other side of the film and positioned therebetween, whereby when said second shutter is activated, light can pass therethrough for allowing a symbol to be exposed on the other side of the film.

8. The camera of claim 7, wherein said first shutter is operably associated with said second shutter so that when said first shutter is activated, said second shutter is automatically activated.

9. The camera of claim 8, further comprising a light transmitting means positioned between said second aperture and said symbol imprinting means for directing the light from said second aperture to and through said symbol imprinting means and onto the film.

10. The camera of claim 8, further comprising a first mirror, a second mirror, and a light tunnel positioned therebetween, wherein said first mirror is positioned proximate said second aperture and said second mirror is positioned proximate said symbol imprinting means for directing the light from said second aperture to and through said symbol imprinting means and onto the film.

11. The camera of claim 9 or 10 further comprising:
 a. a flash bulb for activation when said first shutter is activated when ambient light is insufficient to properly expos the other side of the film with said symbol;
 b. A light transmitting means for allowing light to pass therethrough from said flash bulb to said aperture, so that when said first shutter is activated, light can pass through said second aperture for allowing a symbol to be exposed on the other side of the film.

12. The camera of claim 11, further comprising means for positively positioning said symbol imprinting means in a selected position.

13. The camera of claim 12, wherein said symbol imprinting means comprises at least one flexible disk.

* * * * *

UNITED STATES PATENT AND TRADEMARK OFFICE
CERTIFICATE OF CORRECTION

PATENT NO. : 5,339,125
DATED : August 16, 1994
INVENTOR(S) : Vladimir Fridman, Arthur Zawodny It is certified that error appears in the above-indentified patent and that said Letters Patent is hereby corrected as shown below:

IN THE CLAIMS

Column 5, line 66 after "therethrough to" delete "the other" and insert --one--.

Signed and Sealed this

Thirteenth Day of February, 1996

Attest:

BRUCE LEHMAN

Attesting Officer

Commissioner of Patents and Trademarks